4 Sheets—Sheet 4.
JOHNSON, VAUGHAN & STINNET.
Detaching Horses.
No 28,988. Patented July 3, 1860.
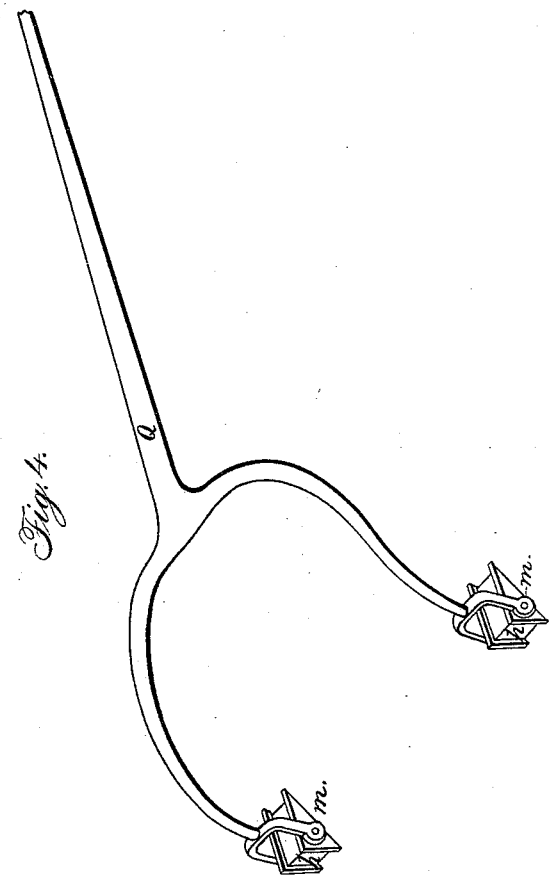
Witnesses:
E. Cohen
J. Hirsch
Inventor:
A. B. Johnson
M. H. Vaughan
J. Stinnet
per their Atty A. B. Stoughton
AM. PHOTO-LITHO. CO. N.Y. (OSBORNE'S PROCESS.)

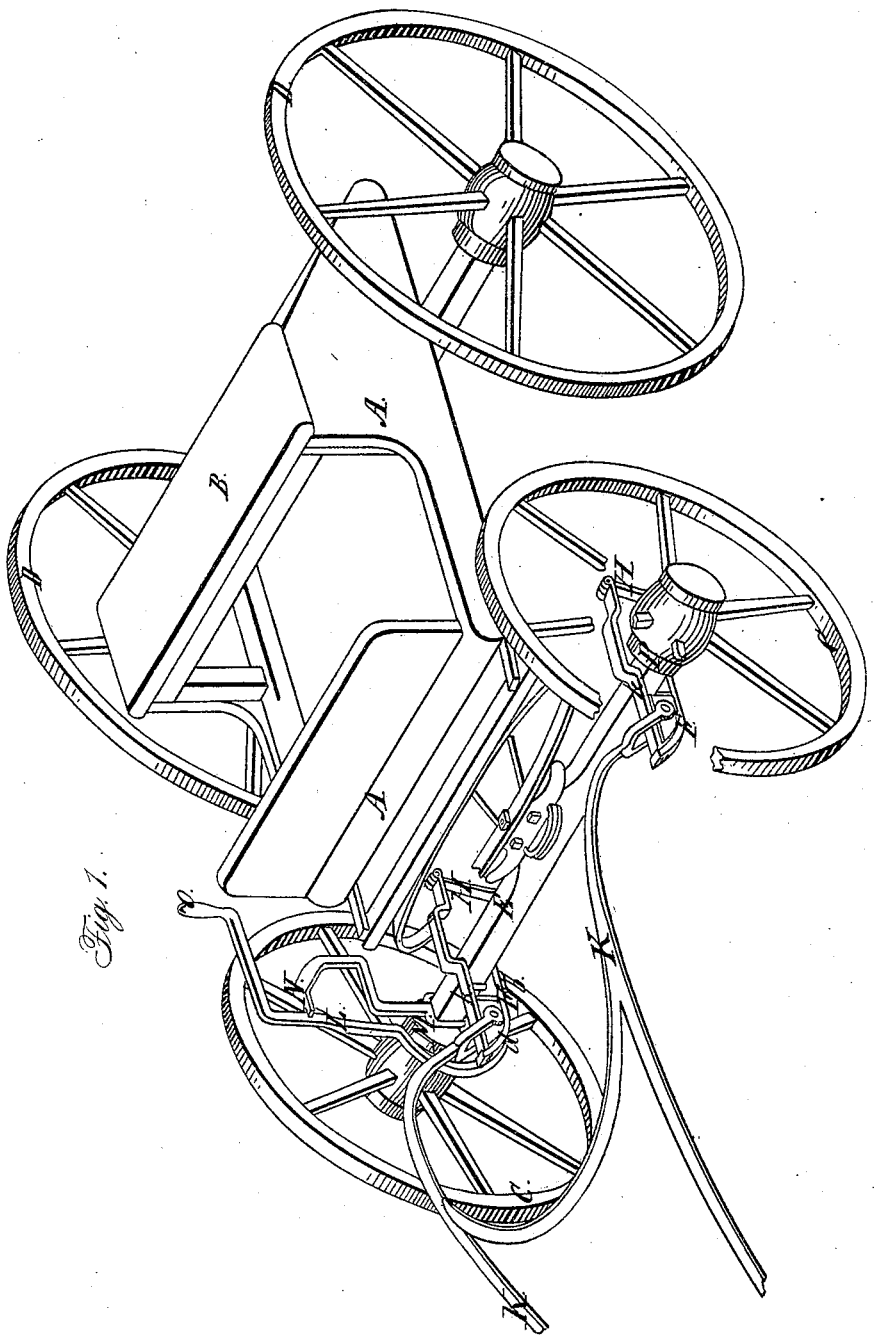

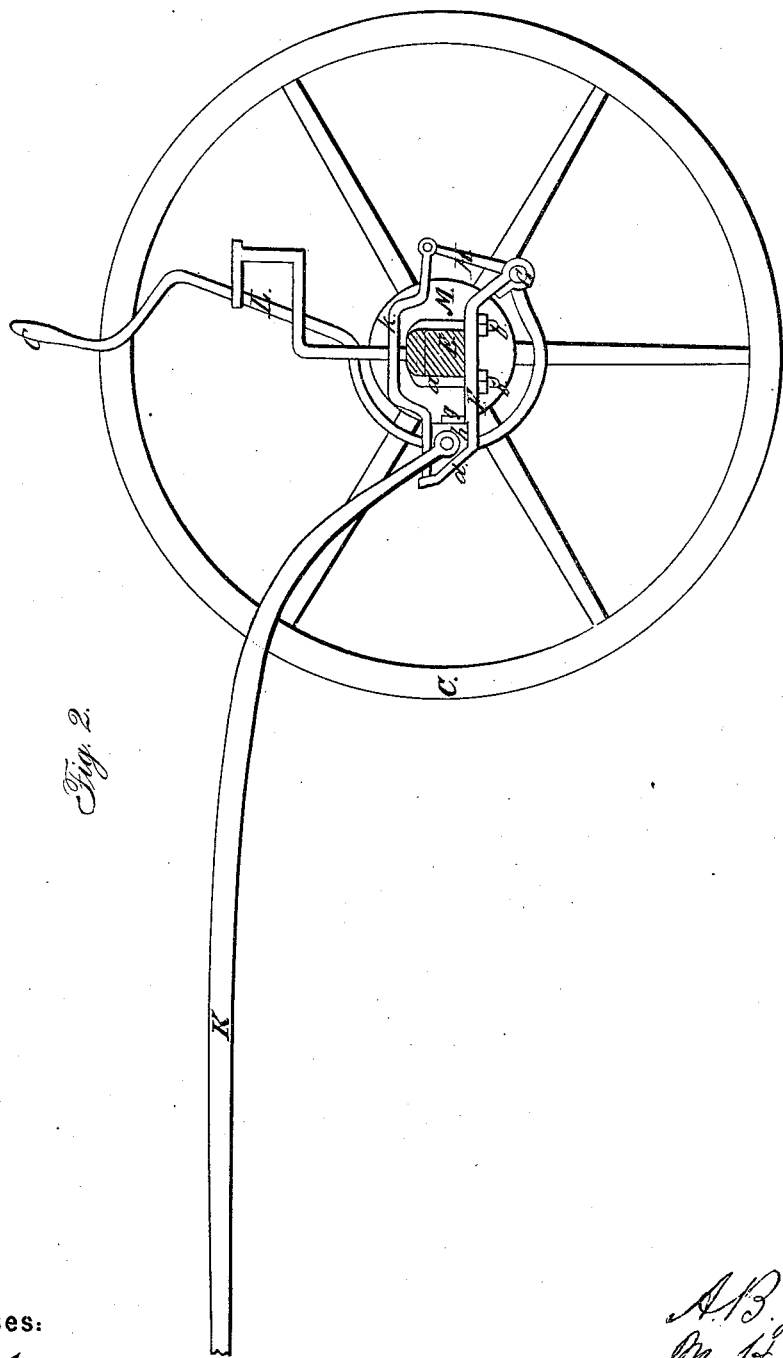

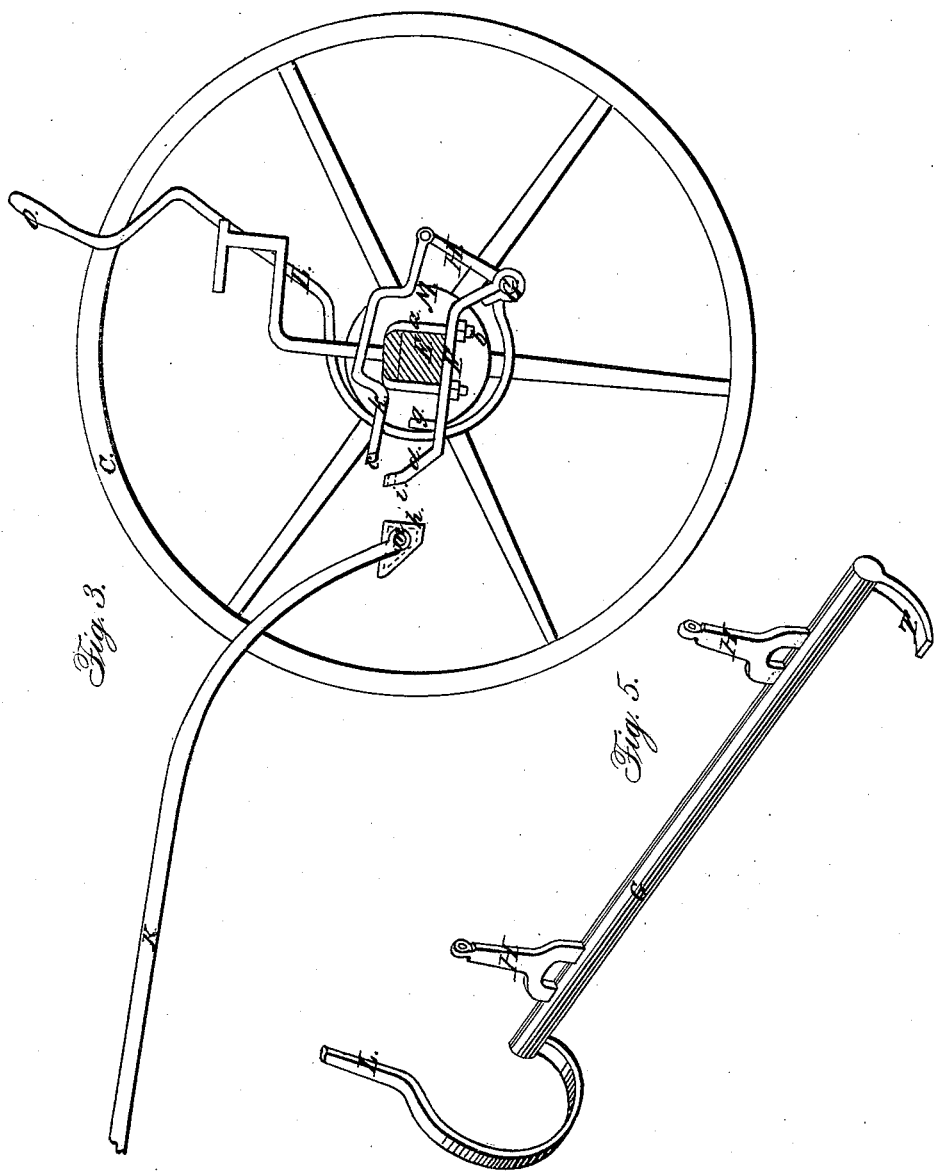

UNITED STATES PATENT OFFICE.

ADOLPHUS B. JOHNSON AND MILTON H. VAUGHAN, OF CLARKSVILLE, ARKANSAS, AND J. STINNETT, OF SHELBY COUNTY, TENNESSEE.

DETACHING HORSES FROM VEHICLES.

Specification of Letters Patent No. 28,988, dated July 3, 1860.

*To all whom it may concern:*

Be it known that we, ADOLPHUS B. JOHNSON and MILTON H. VAUGHAN, of Clarksville, in the county of Johnson and State of Arkansas, and JOHN STINNETT, of the county of Shelby and State of Tennessee, have invented certatin new and useful Improvements in Mechanism for Disconnecting Horses from Buggies or Carriages; and we do hereby declare that the following is a full, clear, and exact description of the construction and operation of the same, reference being had to the accompanying drawings, in which—

Figure 1 represents a perspective view of said carriage. Figs. 2 and 3 represent cross sections through the front axle showing the parts behind it in a side view. Fig. 4 represents a perspective view of a pole which can be attached to the carriage in place of the thills. Fig. 5 represents a detached view hereafter to be referred to.

Our invention relates to the manner of connecting the thills or tongue of a carriage to its front axle so that they may be readily disconnected therefrom by operating a lever from the driver's seat, for the purpose of suddenly detaching the horse or horses from the carriage should they become unmanageable; it also relates to the peculiar construction of said lever by which it will act after detaching the horses as a brake to said carriage and stop the same if it should be running down hill in the above stated emergency.

To enable others skilled in the art to make and use our invention we will proceed to describe its construction and operation.

A represents the carriage body, B the seat, C, the front wheels, D, the hind wheels.

E, represents the front axle which is of the usual construction and to which the devices which constitute our present invention are secured.

F represents a bracket which is bolted to the lower side of the front axle by means of the stirrup, $a$, and the screw nuts $b$, the rear end of said bracket serves as a bearing for the horizontal rock shaft G which can turn in said bearing. The front end, $d$, of the bracket is inclined and together with the projection, $g$, constitutes an angular recess into which the triangular lug $h$ fits tightly when placed therein.

$k$, represents a sliding bolt which is hinged to the lever, H, of the rock shaft G and which is operated from said rock shaft. It has a tongue C, at its front end which fits into the mortise, $i$, and when in this position it retains the lug $h$ firmly in its recess. One of these lugs is secured to each end of the front axle E near the wheels and the pole or thills K, are hinged to said lugs by means of the bolts or pins, $m$, on which they can play freely.

L is a lever which is secured to the end of the rock shaft G. Its lower part is curved so as to pass around the hub, M, of one of the front wheels while its upper part is held stationary by the prongs of a forked standard N; the handle, O, is within the reach of the driver on seat B, who can thus operate the lever at pleasure.

Should the horses become unmanageable and run away, the driver has only to pull the lever L to the rear which movement will turn the rock shaft G and lever H thereby withdrawing the bolt $k$ and releasing the lugs $h$ from their fastening as represented in Fig. 3 and the horses can now run off with the pole or thills leaving the carriage behind them.

When the parts are in the position represented in Fig. 3 the curved part of the lever L is in close contact with the hub M, of one of the front wheels while the curved arm T at the other end of the lever, G, is also in close contact with the hub P of the other front wheel, both these levers in this position act as brakes to the carriage and arrest its motion should the same be running down hill at the time when the horses are detached therefrom.

The devices herein described can be attached to buggies and carriages of almost any description as they do not interfere with the general construction of the same, and the thills can be readily exchanged for a pole Q (Fig. 4) and the carriage is thus with the greatest facility modified to be used with a single horse or with a pair of horses. The shape of the lugs $h$ may be modified to any convenient form but the triangular shape seems best adapted for the above described purpose.

Having thus fully described the nature of our invention what we claim therein as new and desire to secure by Letters Patent is—

1. Attaching the pole or thills of a carriage to the front axle by means of the lugs, $h$, which fit into triangular recesses of the brackets, F, the latter being secured to the front axle substantially in the manner herein described.

2. In combination with the thills K, lugs, $h$, brackets F bolts, $k$, and rock shaft G, the lever, L, for operating the bolts $k$ substantially in the manner herein described.

3. Giving the lever L by which the rock shaft G is operated a curved shape so as to embrace the hub of the wheel when operated and to arrest the motion of the carriage when the horses are detached therefrom substantially in the manner herein described.

ADOLPHUS B. JOHNSON.
MILTON H. VAUGHAN.
JOHN STINNETT.

Witnesses:
S. B. EDMONSON,
D. H. HILDERBRAND.